Patented Apr. 29, 1930

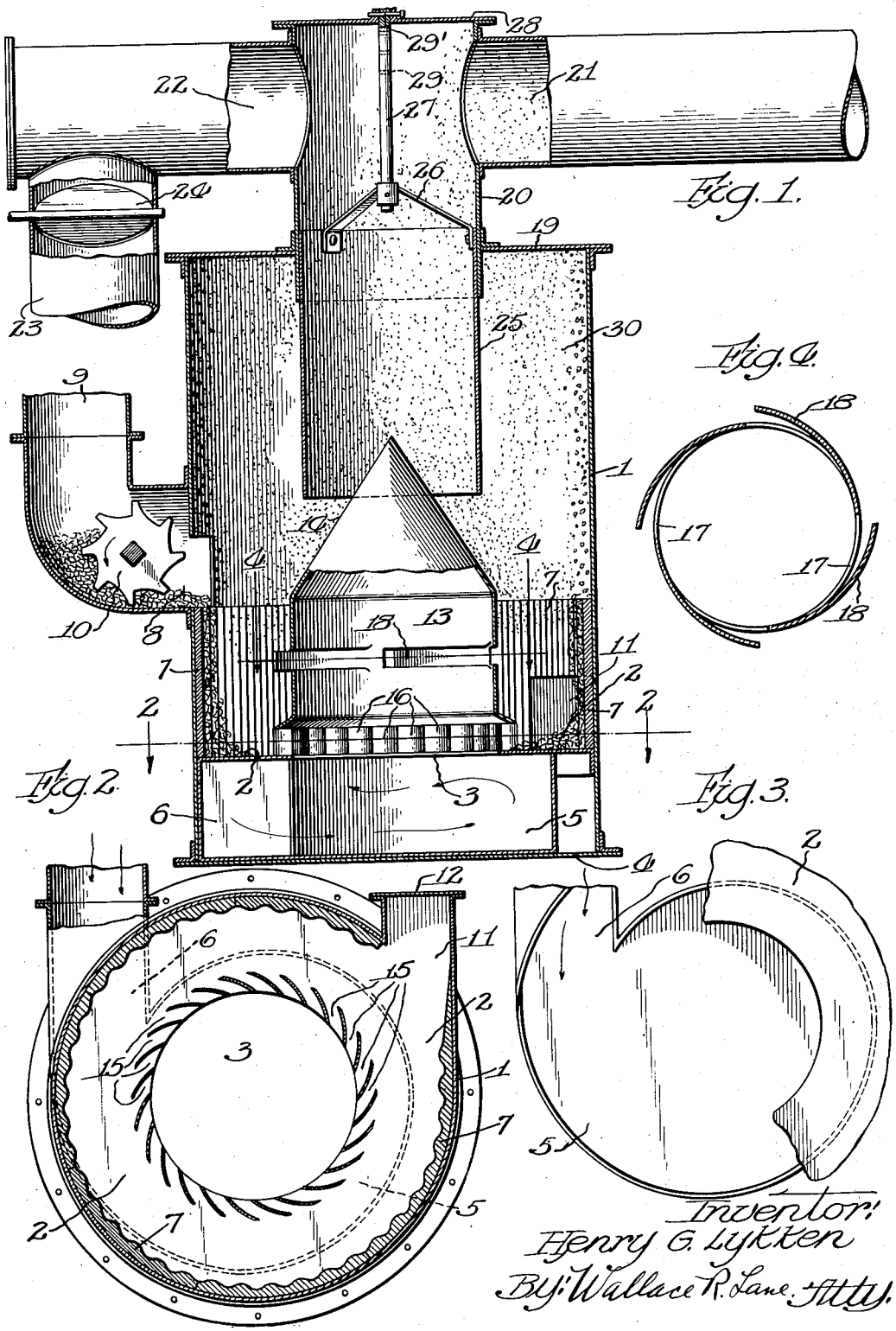

1,756,254

UNITED STATES PATENT OFFICE

HENRY G. LYKKEN, OF MINNEAPOLIS, MINNESOTA

FLUIDIZER AND METHOD OF FLUIDIZING

Application filed January 11, 1928. Serial No. 245,971.

The present invention relates to fluidizers or devices for fluidizing or reducing materials to a finely divided state or fluidal condition and the method of fluidizing.

Among the objects of the invention is to provide a novel means or device as also a novel method of fluidizing or reducing friable materials to a finely divided state or fluidal condition by a vorticose action of a fluid, whether gaseous or liquid, by preferably forcing the fluid at high velocity and under pressure into a rotary vortex or vorticose movement in a confined or closed state or chamber and effecting the reducing action by an absorption or dissipation of the energy of the whirling mass of fluid as it acts upon the material mass such that the whirling strata of particles will stress upon each other to reduce the particles to a fine condition.

In the specific embodiment chosen to illustrate the invention, the fluid used is air and the material reduced is coal, but the use of other fluids and materials is comprehended by this invention. The air is forced at high velocity into a vortex chamber which may be of volute shape or form and the rapidly whirling mass exits from a central opening to pass into a material holding chamber for action upon the material maintained therein, the energy of this mass being dissipated in radial and tangential stresses on the material to entrain the same into a vorticose movement whereby particles act upon particles in adjacent strata to reduce the particles into a fine state or condition. The energized mass, on leaving the volute chamber may be controlled in an inner closed chamber in the material holding chamber, such inner chamber having a series of tangentially disposed nozzles for projecting the mass into the material chamber and against the material therein. The cyclonic or tornado-like eddying or vorticose movement of the air and entrained material particles, is violent enough to be destructive of the existing form of the material, and thereby causes a reduction of the same into a fine dust or finely divided particles. The vorticose movement of the mixture gradually rises and the mixture of reduced particles and air passes to the upper or separating part of the material containing chamber, where the finer particles are separated from the coarser particles, the latter being forced toward the wall of the chamber and to course back to the material body in the chamber for re-reduction. The finer particles and air pass out through a regulatable outlet means. The latter may be varied to vary the fineness of the fines as desired. In this way the separating means and the regulating means act as a classifying device for separating the particles into given different grades or classes of fines. A by-pass may be used to pass back a part of the fluid when a denser concentration of the material in the outgoing stream is required. This by-passing will also aid in the control of the character of the particles conducted off, the by-pass returning and re-using a part of the fluid passing out of the device, such as the outlet thereof, the by-pass being preferably connected between such outlet and inlet to the device. In such event a greater circulation of fluid may be effected than that going to the locus of use of the mixture, such as a combustion space of a furnace or the like. Means may also be provided for the collecting and removing of non-reducible materials and objects, such as tramp metal. Suitable feeding means may be also used to maintain the desired amount of material body in the chamber, and when the material is wet or contains moisture, the same may be dried by preheating the actuating fluid, such as the air, supplied for the reducing purposes. To prevent the material moving bodily or as a unit mass, the wall of the chamber may have anchor or retard means in the form of replaceable bars, or corrugated plates or the like.

Other objects, advantages, capabilities and features are comprehended by the invention as will later appear and are inherently possessed thereby.

Referring to the drawings, Fig. 1 is a view partly in elevation and partly in vertical section of an illustrative embodiment of the invention;

Fig. 2 is a horizontal sectional view taken in a plane represented by line 2—2 in Fig. 1 of the drawings;

Fig. 3 is a top plan view with a part broken away of the lower part of the device showing the volute chamber; and Fig. 4 is a transverse sectional view taken in a plane represented by line 4—4 in Fig. 1 of the drawings.

Referring now more in detail to the drawings, the embodiments selected to illustrate the invention is shown as comprising a chamber 1, having a floor 2 provided with a central opening 3, the wall of the chamber 1 extending downwardly to a base plate 4 secured to the side walls of the chamber in any suitable manner. The chamber 1 may be circular or polygonal or similarly formed. In the lower part and beneath the floor 2 is provided a volute chamber 5 having an air inlet passage 6 and a central outlet opening coinciding with the opening 3. Within the chamber 1 and in the lower part thereof and over the floor 2 is provided a number of bars or corrugated plates 7 forming projections or bars on the inner walls of the chamber 1. At one side, and above the bars 7 is an inlet 8 for the delivery into the chamber 1 of the material to be reduced, the inlet 8 leading from a discharge 9 from a hopper or the like, and including a rotary feed device 10 which may be operated to feed the material at a given rate into the chamber 1. At the opposite side the lower part of the chamber 1 has an outlet passage 11 normally closed by a closure 12 which may be removed when desired to remove non-reducible materials and objects that have sunk to the lower part of the chamber 1 and over the floor 2, the material having been cast into the passage or space 11 adjacent the door 12.

Within the chamber and disposed upon the floor 2 and over the opening 3 is a control chamber 13 of generally cylindrical form and hollow, the upper end of which is formed in a closed cone 14. Near the lower end of the chamber 13 is provided a circular series of nozzles 15 between vanes 16 through which fluid may be projected in a tangential manner into the annular space between the chamber 13 and the wall 1 of the main chamber. These nozzles 15 are located adjacent the opening 3 so that the passage of the fluid will be from the opening 3 into the nozzles and radially and tangentially outwardly into the annular space in the main chamber. Intermediate the height of the chamber 13 may also be provided a number of outlet openings 17 adjacent vanes 18 as clearly shown in Figs. 1 and 4 of the drawings.

The upper end of this chamber 1 has a top or cover 19 having a central opening communicating with an outlet pipe 20 leading to a duct 21 which may lead to a point of use or storage as desired. In the specific embodiment, this duct leads to the combustion chamber of a furnace for delivering thereto a mixture of the air and powdered coal for combustion. To the outlet 20 may also be connected a second duct 22 in turn connected to a pipe 23 which may lead back to the blower or pump connected to the inlet 6 of the volute chamber. Within the pipe 23 may be a valve 24 of any suitable construction for regulating the by-passing of fluids from the outlet 20 to the pump or inlet 6.

The lower end of the outlet 20 extends into the upper part of the chamber 1 and has slidably fitting therein a sleeve or thimble 25 supported from a spider 26 connected to a rod 27 passing through an opening in a top plate 28 of the outlet 20. The rod 27 may be provided with a plurality of holes 29 in which may pass a pin 29' for holding the sleeve 25 in any one selected position of height of the sleeve 25 with reference to the top of the cone 14. The upper part of the chamber 1 constitutes a separating chamber 30 in which reduced particles and air may move in such a manner that the fine particles are separated from the coarse particles and the latter caused to move toward the side wall of the chamber 1 and course down the same to the lower part of the chamber 1 for re-reduction, and the finer particles are drawn with air through the sleeve 25 and outlet 20, the relation of the sleeve 25 and the cone 24 regulating the character of the fines and the rate of outflow.

In the operation of the device, the material to be reduced is fed through the passage 8 into the lower part of the chamber 1 so as to form a body of material therein. The sleeve 25 may be adjusted to the desired height for the particular fines to be obtained. A blower or other fluid forcing device adapted to force or project a fluid, such as air, at a high velocity and under pressure, is operated to force the air into the volute chamber 5. This chamber is of such a shape that it will cause the mass of air to take a very rapid rotary movement in the form of a vortex or rather a vorticose action. The mass of air will then proceed upwardly from the central portion thereof through the opening 3 into the chamber 13 and be forced outwardly through the nozzles 15 into the annular space between the chamber 13 and the main chamber 1 and against the material in said chamber. This will cause a radial stressing upon the material as well as a rotary movement or vorticose action thereof while entraining the material around the chamber 13 and causing a gradual rise of the whirl of the mixture into the separating chamber 30. The bars 7 or corrugations or the like will act as retard members or means to prevent a bodily movement of the material and to also cause a movement of layer upon layer of the material so that the particles of the adjacent strata will be stressed upon each other with a destructive effect of the particles of the material thus reducing them in size. The mixture of the whirling air and reduced particles will rotate in the separating chamber 30 whereby the heavier and larger particles will be thrown toward the outer wall of the chamber 1 and be returned by gravity into the reducing region, and the finer particles will be carried with the air through the opening of the lower end of the sleeve 25 past the apex of the cone 14 and into the outlet 20 and into the duct 21 and to the locus of use. In cases where there is a concentrated action, part of the fluid may be by-passed through the passage 22 to be re-used through the blower or inlet 6, such by-pass being controlled by the valve 24, at will. Some of the air may also pass through the openings 17 in the intermediate portion of the chamber 13 to regulate the character of reduction and the character of the fines of the material reduced.

While I have herein described and upon the drawings shown an illustrative embodiment of the invention, it is to be understood that the latter is not limited thereto but may comprehend other constructions, arrangements of parts, details and features without departing from the spirit thereof.

Having thus disclosed the invention, I claim:

1. A device for fluidizing materials, comprising a chamber for containing material to be reduced, and means within the chamber for causing vorticose action of a fluid and forcing said fluid against said material for reducing the latter, said means directing the fluid tangentially to the inner surface of the vortex.

2. A device for fluidizing materials, comprising a chamber for containing material to be reduced, means within the chamber for causing vorticose action of a fluid and forcing said fluid against said material for reducing the latter, said means directing the fluid tangentially to the inner surface of the vortex, and means connected to said means within the chamber for supplying the fluid at high velocity thereto.

3. A device for fluidizing materials, comprising a chamber for containing material to be reduced, means within the chamber for causing vorticose action of a fluid and forcing said fluid against said material for reducing the latter, said means directing the fluid tangentially to the inner surface of the vortex, said chamber having a space above the material in the chamber for reception of reduced material and fluid for separation of the finer from the coarser particles of material.

4. A device for fluidizing materials, comprising a chamber for containing material to be reduced, means within the chamber for causing vorticose action of a fluid and forcing said fluid against said material for reducing the latter, said means directing the fluid tangentially to the inner surface of the vortex, said chamber having an outlet at its upper end for delivery of a mixture of reduced material and fluid.

5. A device for fluidizing materials, comprising a chamber for containing material to be reduced, means within the chamber for causing vorticose action of a fluid and forcing said fluid against said material for reducing the latter, said means directing the fluid tangentially to the inner surface of the vortex, said chamber having an outlet at its upper end for delivery of a mixture of reduced material and fluid, and means for regulating the outlet for varying the character of the fine particles delivered through said outlet.

6. A device for fluidizing materials, comprising a chamber for containing material to be reduced, means within the chamber for causing vorticose action of a fluid and forcing said fluid against said material for reducing the latter, said means directing the fluid tangentially to the inner surface of the vortex, means connected to said means within the chamber for supplying the fluid at high velocity thereto, said chamber having an outlet at its upper end for delivery of a mixture of reduced material and fluid, and a by-pass means connected to said outlet and said fluid supplying means.

7. A device for fluidizing materials, comprising a chamber for containing material to be reduced, means within the chamber for causing vorticose action of a fluid and forcing said fluid against said material for reducing the latter, said means directing the fluid tangentially to the inner surface of the vortex, a separating chamber above the material in the material containing chamber, and an outlet means for the separating chamber.

8. A device for fluidizing materials, comprising an outer chamber, an inner chamber, a body of material between the chambers, said inner chamber having tangential outlets for directing fluid at high velocity into the space between the chambers to cause a vorticose action of the material body and fluid whereby the material is reduced to a fine condition, and means for supplying fluid at high velocity to said inner chamber.

9. A device for fluidizing materials, comprising an outer and inner chamber, means for supplying fluid at high velocity to said inner chamber, means for separating fine particles from coarse particles of reduced material, and means for conducting off separated fine particles and fluid.

10. A device for fluidizing materials, comprising an outer and inner chamber, means for supplying fluid at high velocity to said inner chamber, means for separating fine particles from coarse particles of reduced material, means for varying the separation of said particles, and means for conducting off separated fine particles and fluid.

11. A device for fluidizing materials, comprising a chamber for containing material to be reduced, and a volute shaped chamber having an inlet for entry of a fluid at high velocity and an outlet for discharging a rotary mass of fluid into said material containing chamber for reducing the material therein.

12. A device for fluidizing materials, comprising a chamber for containing material to be reduced, a volute shaped chamber having an inlet for entry of a fluid at high velocity and an outlet for discharging a rotary mass of fluid into said material containing chamber for reducing the material therein, and means for holding a body of the material against bodily movement in said material containing chamber.

13. A device for fluidizing materials, comprising a chamber for containing material to be reduced, a volute shaped chamber having an inlet for entry of a fluid at high velocity and an outlet for discharging a rotary mass of fluid into said material containing chamber for reducing the material therein, and means in said material containing chamber for separating out fine from coarse particles of reduced material.

14. A device for fluidizing materials, comprising a chamber for containing material to be reduced, a volute shaped chamber having an inlet for entry of a fluid at high velocity and an outlet for discharging a rotary mass of fluid into said material containing chamber for reducing the material therein, means in said material containing chamber for separating out fine from coarse particles of reduced material, and means for regulating the fineness of the fine particles so separated.

15. A device for fluidizing materials, comprising a chamber for containing material to be reduced, a volute shaped chamber having an inlet for entry of a fluid at high velocity and an outlet for discharging a rotary mass of fluid into said material containing chamber, a third chamber within the material containing chamber and communicating with the volute chamber for receiving the rotary mass of fluid therefrom and having tangential discharge outlets for projecting the fluid at high velocity and with a vorticose action against the material in the material containing chamber for causing a reduction of the same to fine particles.

16. A device for fluidizing materials, comprising a chamber for containing material to be reduced, a volute shaped chamber having an inlet for entry of a fluid at high velocity and an outlet for discharging a rotary mass of fluid into said material containing chamber, a third chamber within the material containing chamber and communicating with the volute chamber for receiving the rotary mass of fluid therefrom and having tangential discharge outlets for projecting the fluid at high velocity and with a vorticose action against the material in the material containing chamber for causing a reduction of the same to fine particles, and means for separating out the finer particles.

17. A device for fluidizing materials, comprising a chamber for containing material to be reduced, a volute shaped chamber having an inlet for entry of a fluid at high velocity and an outlet for discharging a rotary mass of fluid into said material containing chamber, a third chamber within the material containing chamber communicating with the volute chamber for receiving the rotary mass of fluid therefrom and having tangential discharge outlets for projecting the fluid at high velocity and with a vorticose action against the material in the material containing chamber for causing a reduction of the same to fine particles, means for separating out the finer particles, and means for regulating the fineness of the separated particles.

18. A device for fluidizing materials, comprising a chamber for containing material to be reduced, a volute device for setting a mass of air into a high velocity vorticose movement, means for discharging said mass of air into a whirl into said chamber for reducing said material by a vorticose action, means for supplying the air to the volute device, and means for conducting off reduced material and air.

19. A device for fluidizing materials, comprising a chamber for containing material to be reduced, a volute device for setting a mass of air into a high velocity vorticose movement, means for discharging said mass of air into a whirl into said chamber for reducing said material by a vorticose action, means for supplying the air to the volute device, means for conducting off reduced material and air, and a by-pass between said conducting-off means and said air supply means.

20. A device for fluidizing materials, comprising a chamber for containing material to be reduced, a volute device for setting a mass of air into a high velocity vorticose movement, means for discharging said mass of air into a whirl into said chamber for reducing said material by a vorticose action, means for supplying the air to the volute device, means for conducting off reduced material and air, and means for collecting non-reducible material in the lower part of said chamber.

21. The method of fluidizing materials, comprising giving a mass of air a vorticose movement at high velocity in a closed chamber, feeding material into said chamber, directing the air tangentially from the inner surface of the vortex and against the material in the chamber, and conducting-off reduced material and air.

22. The method of fluidizing materials, comprising giving a mass of air a vorticose movement at high velocity in a closed chamber, feeding material into said chamber, projecting the air from the vortex thereof into said chamber and against said material under pressure and tangentially from the central portion of the vortex.

23. The method of fluidizing materials, comprising giving a mass of air a vorticose movement at high velocity in a closed chamber, maintaining a body of material in the chamber, directing the air tangentially from the inner surface of the vortex and against the material in the chamber, and reducing the material by the dissipation of the energy of the air vortex.

24. The method of fluidizing materials, comprising giving a mass of air a vorticose movement at high velocity in a closed chamber maintaining a body of material in the chamber, and introducing the air tangentially from the inner surface of the vortex and against the material in the chamber.

In witness whereof, I hereunto subscribe my name to this specification.

HENRY G. LYKKEN.